US012717809B1

(12) United States Patent
Kancharla et al.

(10) Patent No.: US 12,717,809 B1
(45) Date of Patent: Aug. 25, 2026

(54) TEMPLATE-BASED AUTOMATED DATA PIPELINE EXECUTION WITH SOURCE INGESTION TRIGGERS AND CLUSTER PROVISIONING

(71) Applicant: Capital One Services, LLC, McLean, VA (US)

(72) Inventors: Gopi Kancharla, Frisco, TX (US); Padmapriya Soundararajan, Frisco, TX (US); Suresh Sammeta, Frisco, TX (US); Christopher Nicotra, Holiday, FL (US); Kuldeep Chaudhary, McKinney, TX (US); Ramya Prasad, Plano, TX (US); Kamlesh Talreja, Bellevue, WA (US); Salim Memon, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/063,968

(22) Filed: Feb. 26, 2025

(51) Int. Cl.
*G06F 16/00* (2019.01)
*G06F 16/25* (2019.01)
*G06F 16/28* (2019.01)

(52) U.S. Cl.
CPC .......... *G06F 16/258* (2019.01); *G06F 16/285* (2019.01)

(58) Field of Classification Search
None
See application file for complete search history.

(56) References Cited

U.S. PATENT DOCUMENTS 7,650,331 B1 1/2010 Dean et al.
11,238,048 B1 * 2/2022 Breeden ................ G06F 16/906
11,615,082 B1 * 3/2023 Shrigondekar ....... G06F 16/245 707/769
11,989,592 B1 * 5/2024 Kulkarni ............. H04L 63/0853
12,118,015 B1 * 10/2024 Jonsson ................ G06F 16/258
2010/0332990 A1 * 12/2010 Prahlad ............... G06F 11/1448 707/654
2014/0259190 A1 * 9/2014 Kiang ..................... G06F 21/51 726/30
2015/0199239 A1 * 7/2015 Prahlad ................ G06F 16/252 707/654
2017/0249646 A1 * 8/2017 Krupa ................ G06Q 30/0201
2019/0320310 A1 * 10/2019 Horelik ................ H04M 3/5116
2021/0342125 A1 * 11/2021 Burnett ..................... G06F 8/34

(Continued)

*Primary Examiner* — Farhan M Syed
(74) *Attorney, Agent, or Firm* — Harrity & Harrity, LLP

(57) ABSTRACT

In some implementations, a data pipeline execution system may obtain, in accordance with a data source ingestion configuration, an indication of an event-based data source ingestion trigger associated with the first data source and an indication of a time-based data source ingestion trigger associated with the second data source. The data pipeline execution system may provision a cluster in response to one or more of the event-based data source ingestion trigger or the time-based data source ingestion trigger. The data pipeline execution system may execute, using the cluster, a data pipeline associated with a data pipeline template in accordance with a data pipeline file, including: read data from the first data source or the second data source, perform a transformation of the data, and write the transformed data to a target data storage location. The data pipeline execution system may generate a data pipeline execution completion notification.

20 Claims, 5 Drawing Sheets

(56) References Cited

U.S. PATENT DOCUMENTS

| | | | | |
|---|---|---|---|---|
| 2022/0206872 | A1* | 6/2022 | Gkoufas | G06N 20/00 |
| 2022/0207140 | A1* | 6/2022 | Mooney, III | G06F 21/577 |
| 2022/0283986 | A1* | 9/2022 | Kandula | G06F 16/122 |
| 2025/0272338 | A1* | 8/2025 | Sajja | G06F 16/906 |
| 2026/0050608 | A1* | 2/2026 | Zacharias | G06F 16/283 |

* cited by examiner

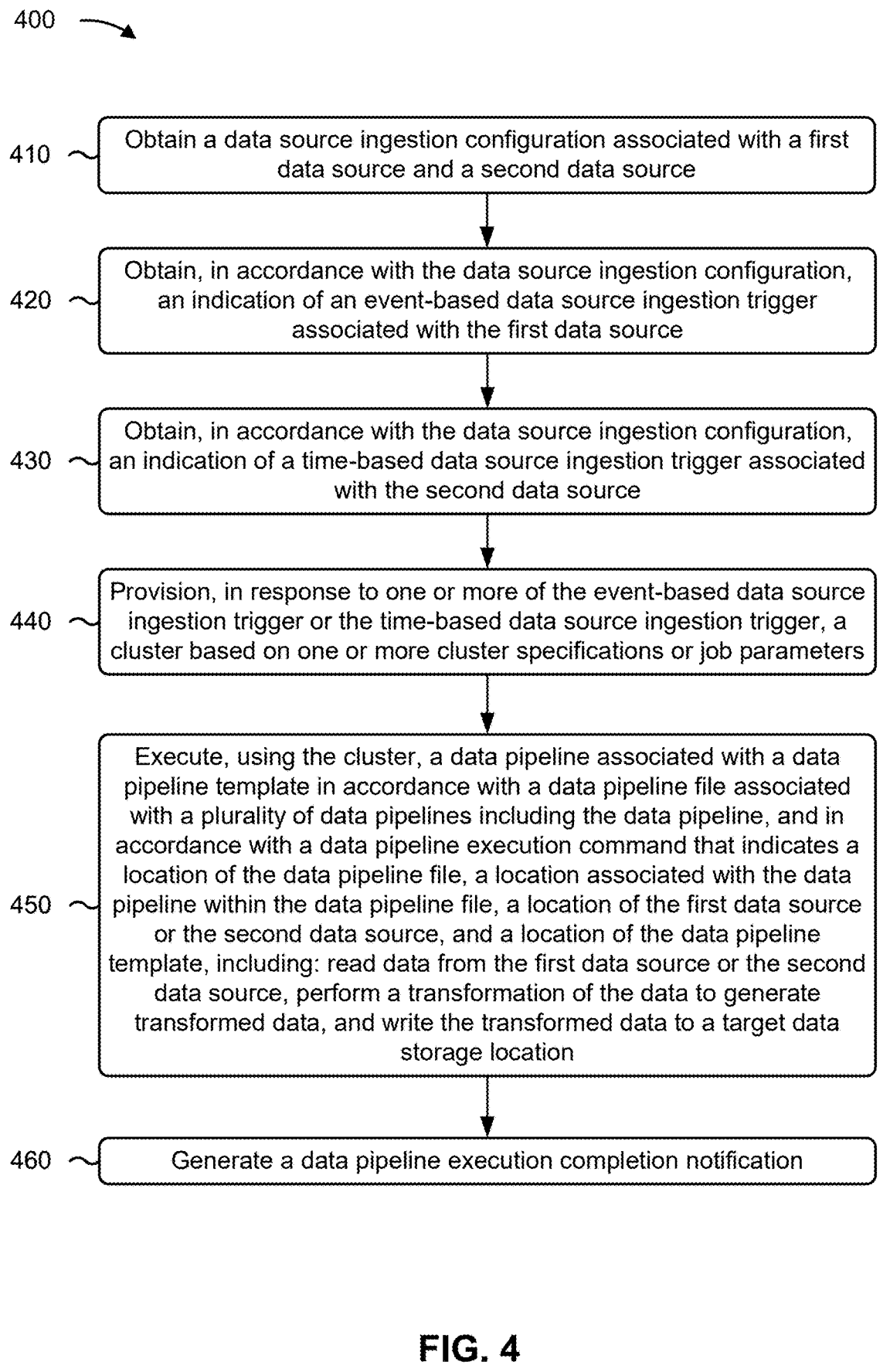

400

410 Obtain a data source ingestion configuration associated with a first data source and a second data source 420 Obtain, in accordance with the data source ingestion configuration, an indication of an event-based data source ingestion trigger associated with the first data source 430 Obtain, in accordance with the data source ingestion configuration, an indication of a time-based data source ingestion trigger associated with the second data source 440 Provision, in response to one or more of the event-based data source ingestion trigger or the time-based data source ingestion trigger, a cluster based on one or more cluster specifications or job parameters 450 Execute, using the cluster, a data pipeline associated with a data pipeline template in accordance with a data pipeline file associated with a plurality of data pipelines including the data pipeline, and in accordance with a data pipeline execution command that indicates a location of the data pipeline file, a location associated with the data pipeline within the data pipeline file, a location of the first data source or the second data source, and a location of the data pipeline template, including: read data from the first data source or the second data source, perform a transformation of the data to generate transformed data, and write the transformed data to a target data storage location 460 Generate a data pipeline execution completion notification

FIG. 4

TEMPLATE-BASED AUTOMATED DATA PIPELINE EXECUTION WITH SOURCE INGESTION TRIGGERS AND CLUSTER PROVISIONING

BACKGROUND

Data workflows can integrate data from various sources into a data processing platform. Often, a data processing platform collects and processes data using multiple custom data workflows corresponding to different sources, different types of data, different processing operations, or the like.

SUMMARY

Some implementations described herein relate to a system for data pipeline execution. The system may include one or more memories and one or more processors communicatively coupled to the one or more memories. The one or more processors may be configured to obtain a data source ingestion configuration associated with a first data source and a second data source. The one or more processors may be configured to obtain, in accordance with the data source ingestion configuration, an indication of an event-based data source ingestion trigger associated with the first data source. The one or more processors may be configured to obtain, in accordance with the data source ingestion configuration, an indication of a time-based data source ingestion trigger associated with the second data source. The one or more processors may be configured to provision, in response to one or more of the event-based data source ingestion trigger or the time-based data source ingestion trigger, a cluster based on one or more cluster specifications or job parameters. The one or more processors may be configured to execute, using the cluster, a data pipeline associated with a data pipeline template in accordance with a data pipeline file associated with a plurality of data pipelines including the data pipeline, and in accordance with a data pipeline execution command that indicates a location of the data pipeline file, a location associated with the data pipeline within the data pipeline file, a location of the first data source or the second data source, and a location of the data pipeline template, including: read data from the first data source or the second data source, perform a transformation of the data to generate transformed data, and write the transformed data to a target data storage location. The one or more processors may be configured to generate a data pipeline execution completion notification that indicates a data pipeline execution success or a data pipeline execution failure.

Some implementations described herein relate to a method of data pipeline execution. The method may include obtaining a data source ingestion configuration associated with a first data source and a second data source. The method may include obtaining, in accordance with the data source ingestion configuration, an indication of an event-based data source ingestion trigger associated with the first data source. The method may include obtaining, in accordance with the data source ingestion configuration, an indication of a time-based data source ingestion trigger associated with the second data source. The method may include provisioning, in response to one or more of the event-based data source ingestion trigger or the time-based data source ingestion trigger, a cluster based on one or more cluster specifications or job parameters. The method may include executing, using the cluster, a data pipeline associated with a data pipeline template in accordance with a data pipeline file associated with a plurality of data pipelines including the data pipeline, and in accordance with a data pipeline execution command that indicates a location of the data pipeline file, a location associated with the data pipeline within the data pipeline file, a location of the first data source or the second data source, and a location of the data pipeline template, including: reading data from the first data source or the second data source, performing a transformation of the data to generate transformed data, and writing the transformed data to a target data storage location. The method may include generating a data pipeline execution completion notification.

Some implementations described herein relate to a non-transitory computer-readable medium that stores a set of instructions. The set of instructions, when executed by one or more processors of a device, may cause the device to obtain a data source ingestion configuration associated with a first data source and a second data source. The set of instructions, when executed by one or more processors of the device, may cause the device to obtain, in accordance with the data source ingestion configuration, an indication of an event-based data source ingestion trigger associated with the first data source. The set of instructions, when executed by one or more processors of the device, may cause the device to obtain, in accordance with the data source ingestion configuration, an indication of a time-based data source ingestion trigger associated with the second data source. The set of instructions, when executed by one or more processors of the device, may cause the device to provision, in response to one or more of the event-based data source ingestion trigger or the time-based data source ingestion trigger, a cluster based on one or more cluster specifications or job parameters. The set of instructions, when executed by one or more processors of the device, may cause the device to execute, using the cluster, a data pipeline associated with a data pipeline template in accordance with a data pipeline file associated with a plurality of data pipelines including the data pipeline, in accordance with a data pipeline execution command that indicates a location of the data pipeline file, a location associated with the data pipeline within the data pipeline file, a location of the first data source or the second data source, and a location of the data pipeline template, and in accordance with one or more environment-specific configurations indicating one or more of proxy information or authentication information, including: read data from the first data source or the second data source, perform a transformation of the data to generate transformed data, and write the transformed data to a target data storage location. The set of instructions, when executed by one or more processors of the device, may cause the device to generate a data pipeline execution completion notification.

BRIEF DESCRIPTION OF THE DRAWINGS

FIG. 4 is a flowchart of an example process associated with data pipeline execution, in accordance with some embodiments of the present disclosure.

DETAILED DESCRIPTION

Figure 1A:
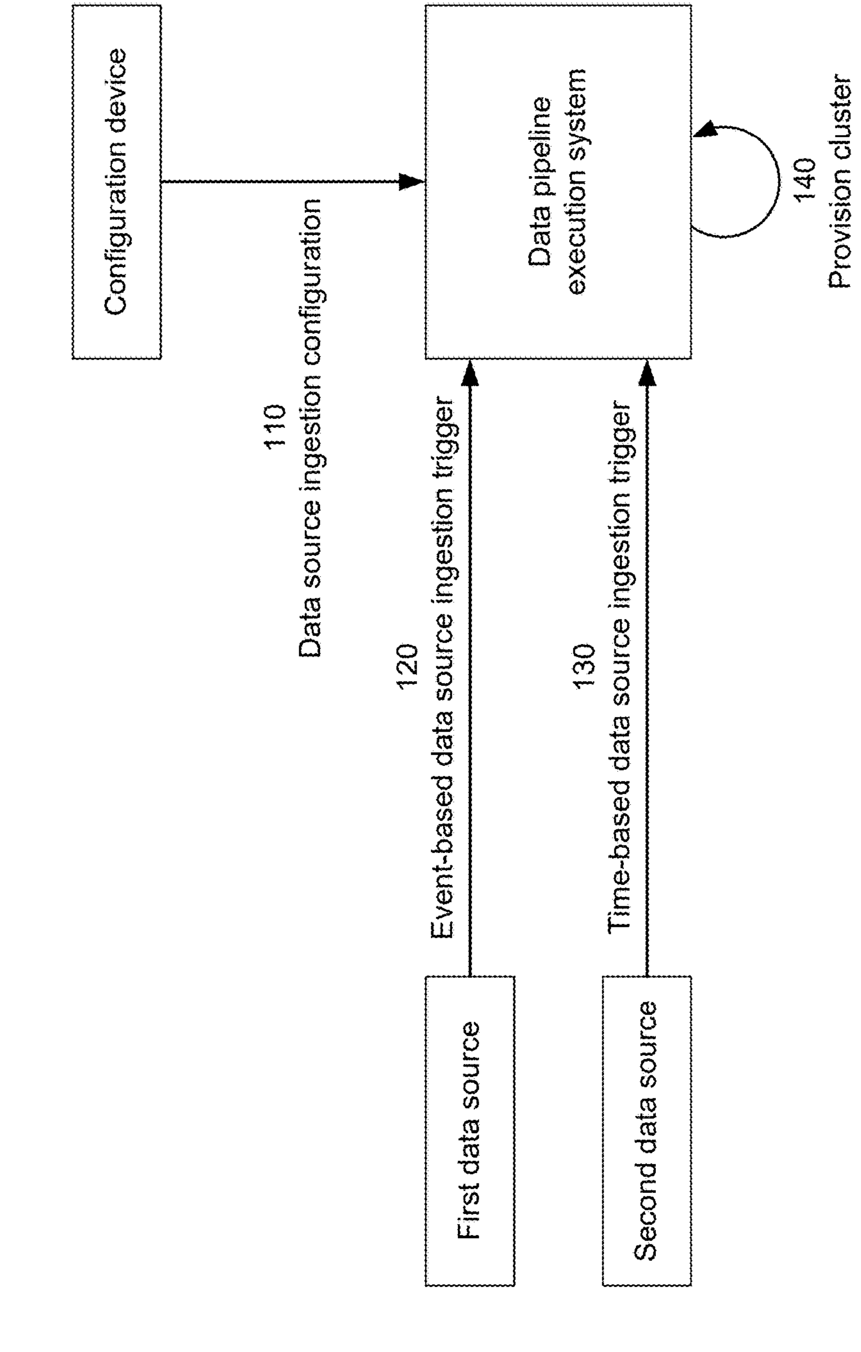
FIGS. 1A-1B are diagrams of an example implementation associated with data pipeline execution, in accordance with some embodiments of the present disclosure.

The following detailed description of example implementations refers to the accompanying drawings. The same reference numbers in different drawings may identify the same or similar elements.

Developing and maintaining data pipelines (e.g., data workflows) often involves excessive memory and processing resources, such as in cases where the data pipelines are associated with a diverse set of entities with unique data ingestion needs. For example, current approaches to data pipeline management may support a multitude of data pipelines that collect data from varying data sources, handle different data processing operations, and deliver processed data to multiple destinations using excessive memory and processing resources. For example, such approaches may handle each data pipeline separately, which may result in duplicated or redundant utilization of memory and processing resources. Additionally, or alternatively, the process of adapting to changes in data processing requirements typically involves extensive modifications to existing workflows, and such extensive modifications can consume excessive memory and processing resources. Moreover, adapting to changes in data processing requirements may be error-prone, and resolving these errors may consume further memory and processing resources. In some examples, adapting to changes in data processing requirements may be time-consuming, which may lead to downstream technical challenges, such as lack of artificial intelligence (AI) ready data. Additionally, or alternatively, different data processing types (e.g., batch processing and real-time processing) can lead to inefficient (e.g., duplicated) use of memory and processing resources.

Some implementations described herein provide a template-based approach for automated creation and execution of data pipelines that leverages an adaptable templating engine. In some examples, a data pipeline system may receive an indication to perform time-based (e.g., batch) and/or event-based (e.g., real-time) data processing and, in response, provision a cluster that is configured to read and process data pipeline templates for the data processing. For example, the system may dynamically build a data pipeline (e.g., a data ingestion pipeline) tailored to specific data processing parameters. In some examples, the system may dynamically build the data pipeline using a data pipeline template (e.g., a template configuration of the data pipeline template) that defines one or more operations of the data pipeline. For example, the template may define one or more read operations, transformation operations, and write operations. Additionally, or alternatively, the system may dynamically build the data pipeline using a data pipeline file that can be applied to a plurality of data pipelines.

In some examples, the system may use the cluster to execute the data pipeline within a data processing architecture of the system. For example, the system may carry out the one or more read operations, transformation operations, and write operations defined in the template. The read operation(s) may involve ingesting time-based and/or event-based data from one or more configured data sources. The transformation operation(s) may involve changing a structure or values of the data. The write operation(s) may involve storing the transformed data in target data storage. In some examples, the system may notify one or more users upon completing execution of the data pipeline. For example, the system may indicate that the execution was successful or failed. For example, if the execution failed, then the system may provide one or more error messages that indicate why the execution failed. In some examples, the system may be dynamic and operate through a self-serviceable mechanism. In some examples, the system may be adaptable for future needs and may be adjusted to accommodate various types of emerging user interface technologies.

As a result, the system may dynamically build and execute multiple data pipelines having varied read, transformation, and write operations using reduced memory and processing resources. For example, the template-based approach may abstract the complexity of data processing tasks. For example, the system may leverage the template configuration to streamline and standardize the management of data pipelines, which may help to reduce memory and processing resource utilization. In some examples, the system may accelerate AI-ready data by delivering pre-transformed, structured data from a source to a destination, thereby helping to ensure scalability for advanced AI modeling.

Additionally, or alternatively, the template-based approach may enable users to define and configure complex data pipelines without writing code, which may help to reduce processing and memory resource utilization caused by errors in manual coding. By using a declarative data pipeline template that defines a sequence of operations (e.g., read, transform, and write), users may establish data pipelines with varying processing requirements. For example, the system may provide a no-code interface whereby users can define, design, configure, generate, and/or manage data processing pipelines without writing code, which may help to improve accessibility of the systems to non-technical users. For example, the system may provide an intuitive, code-free solution that empowers engineers to design and generate custom data processing workflows using a user-friendly interface for self-driving. For example, the system may enable quick design and deployment of data pipelines without coding (e.g., via a flexible, no-code interface, which may increase agility and responsiveness). In some examples, data pipeline creation and execution may be streamlined in an automated fashion, thereby reducing instances of manual intervention. For example, automating the generation and scheduling of data pipelines may help to ensure timely and efficient data processing, thereby improving overall productivity. In some examples, the system may offer consistent execution of data processing tasks by adhering to predefined schedules, which may minimize the risk of errors. Moreover, automated data pipelines may help to ensure that data processing adheres to predefined schedules and protocols.

Additionally, or alternatively, the template-based approach may help to improve flexibility, reusability, and modification, which may help to reduce processing and memory resource utilization caused by redundant operations associated with designing and/or executing the data pipelines. For example, different users or use cases may leverage the same template structure, with certain parameter adjustments (e.g., data source, transformation rules, or destination), which may enable the adaptable templating engine to simultaneously process multiple data pipeline templates with varying configurations without using custom logic for each unique data pipeline. For example, users may adjust data processing parameters using an interface allowing for quick adaptation. Thus, the system may deliver high-performing data processing capabilities by writing a data processing template once and then running the data processing template for many data pipelines. Seamlessly specifying data sources within a data pipeline template may reduce complex custom logic, as the system may handle the underlying complexities of data ingestion.

Additionally, or alternatively, the template-based approach may enable the system to scale efficiently by isolating the logic of each data pipeline in a reusable, standardized format. For example, the cluster may handle a high volume of data pipelines concurrently (e.g., by parallelizing the processing of multiple data pipeline templates), which may help to reduce overhead and improve memory and processing resource utilization. In some examples, this scalability may enable the system to handle large sets of data for large-scale data processing tasks. Moreover, the system may execute the data pipeline in a distributed manner across the cluster for efficient pipeline execution. Upon a network-related failure, the cluster may automatically recover and attempt to complete the data pipeline successfully. Because the data pipeline processing may proceed from the beginning, the system may refrain from committing results until the data pipeline has been fully executed, which may limit manual intervention by developers to investigate the problem and/or manual attempts to restart the data pipeline, thereby improving memory and processing resource utilization efficiency. Automating the provisioning of clusters (e.g., based on the data event specifications) may help to ensure scalability, efficiency, and flexibility in handling diverse data processing tasks.

Additionally, or alternatively, the template-based approach may use memory and processing resources efficiently by enabling the system to integrate with a wide array of platforms and/or data architectures (e.g., data storage and processing systems), which may help to ensure that data pipelines can be quickly adapted to diverse parameters. For example, the template configuration model may provide a data processing architecture that empowers users to define complex data workflows in a declarative manner. In some examples, the system may support versatile execution using an integrated mechanism that can handle both batch and real-time data processing within the same architecture, thereby offering flexibility for different data processing units. Thus, the system may support various data processing requirements (e.g., through batch and real-time capabilities).

Additionally, or alternatively, memory and processing resources may be reduced because the same data pipeline file may be used for all data pipelines (e.g., regardless of the specific data pipeline template or data configuration). For example, complex changes or new deployments may be avoided in cases where a new data pipeline is used. If changes or updates are made (e.g., to introduce functionality or bug fixes), then a modified data pipeline file may be recompiled and uploaded to storage, where the system may access and use the data pipeline file for all data pipelines.

Thus, the data pipeline system may provide fast, flexible, accurate, user-friendly, and scalable data insights with reduced custom coding across diverse use cases and data processing parameters. For example, the system may abstract away underlying complexities of data processing, allowing users to focus on defining the logic of a data pipeline while the system handles the execution details. For example, users may configure data pipeline templates that accommodate a variety of data sources, transformation requirements, and destinations and destination formats, without performing manual coding. The data pipeline system may reduce time, cost, and complexity (e.g., memory and processing resource requirements) involved in building and maintaining custom data pipelines, while ensuring seamless integration across different data sources and destinations. The system may be a powerful, scalable, out-of-the-box framework for executing templated data pipelines that provides ease of use and flexibility for deployment and configuration management and supports the dynamic creation of customizable data ingestion architectures.

Figure 1B:
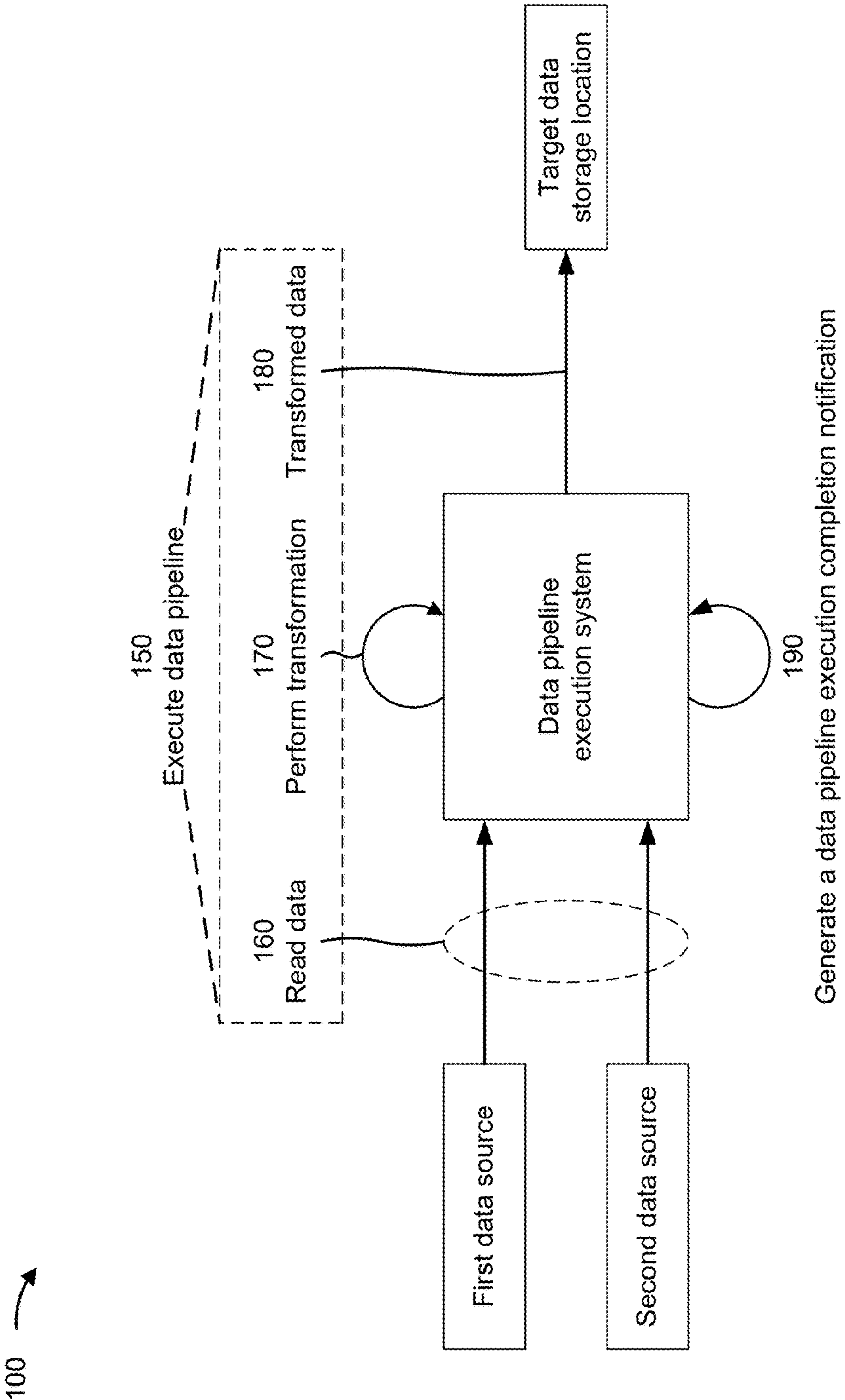

FIGS. 1A-1B are diagrams of an example implementation 100 associated with data pipeline execution. As shown in FIGS. 1A-1B, example implementation 100 includes a first data source, a second data source, a data pipeline execution system, a configuration device, and a target data storage location. These devices are described in more detail below in connection with FIG. 2 and FIG. 3.

With reference to FIG. 1A, as shown by reference number 110, the data pipeline execution system may obtain, from the configuration device, a data source ingestion configuration associated with a first data source and a second data source. The data source ingestion configuration (which may be referred to as a "data source event configuration") may configure a data source event, such as an ingestion of data from the data source. For example, the data source ingestion configuration may indicate one or more data source ingestion triggers that prompt the data source event. For example, the data pipeline execution system may use the data source ingestion configuration to detect and process data ingestion events that occur that are triggered by user-configured settings. The data pipeline execution system may handle multiple data source events simultaneously by extracting information from data source ingestion triggers and ingesting data from multiple data sources accordingly. The data source ingestion configuration may be associated with the first data source and the second data source in that the data source ingestion configuration may indicate information pertinent to ingesting data from the first data source and the second data source. Thus, the data pipeline execution system may be configured to ingest data from various platforms, such as the first data source and the second data source.

In some aspects, the data source ingestion configuration may indicate a dynamic file location naming protocol. For example, the data source ingestion configuration may configure the data pipeline execution system to use the dynamic file location naming protocol to identify data stored in a file in one or more dynamic file locations. The dynamic file location naming protocol may indicate a scheme for naming dynamic file locations. A file location of a data source may be dynamic in that the location of the file may depend on a time at which the file is stored in the data source. For example, a location of a file specified in one or more message attributes of an event notification may change based on the day on which the file is stored, and the dynamic file location naming protocol may enable the data pipeline execution system to account for this behavior by monitoring specific prefixes or patterns in the message attribute(s) that change according to time-sensitive naming conventions. For example, after a file is uploaded to a location that follows a dynamic file location naming pattern, the data pipeline execution system may dynamically identify the location of the file using metadata, such as date stamps, unique file names, or the like.

In some aspects, one or more of the first data source or the second data source may include one or more of a file-based data source, a relational database table, a data warehouse, or an application programming interface (API). For example, a file-based data source may be a data source that stores data in files. The file-based data source may follow the dynamic file location naming protocol discussed above. The relational database may store data organized according to rows and columns of the relational database. The data warehouse may be a centralized repository that stores data. The API may enable the data pipeline execution system to interact with (e.g., retrieve) data from data storage.

As shown by reference number 120, the data pipeline execution system may obtain, in accordance with the data source ingestion configuration, an indication (e.g., an event notification) of an event-based data source ingestion trigger associated with the first data source. The event-based data source ingestion trigger may be a data source ingestion trigger that is indicated responsive to an occurrence of a data ingestion event that prompts data ingestions. In some examples, the data ingestion event may include a data storage event. For example, the data pipeline execution system may monitor data storage locations (e.g., specific file paths) designated by a user and detect when new files are stored in one or more of the data storage locations. The data pipeline execution system may identify the new files based on unique patterns or metadata, such as timestamps, file names, or other identifying attributes. For example, the data pipeline execution system may identify the new files in accordance with the dynamic file location naming protocol. In some examples, the data ingestion event may include a data availability event. For example, the data pipeline execution system may subscribe to a topic associated with the data availability event, monitor for incoming messages published to the topic, receive a message published to the topic indicating that one or more new files are available, identify the data availability event (e.g., identify the one or more new files), and process the relevant file(s) based on metadata included in the message. In some examples, the data pipeline execution system may capture data ingestion events in real-time. For example, a user may configure a data source to transmit custom event notifications upon occurrence of a specific action.

As shown by reference number 130, the data pipeline execution system may obtain, in accordance with the data source ingestion configuration, an indication (e.g., an event notification) of a time-based data source ingestion trigger associated with the second data source. The time-based data source ingestion trigger may be a data source ingestion trigger that is indicated responsive to an occurrence of a time that prompts data ingestions. For example, the data pipeline execution system may obtain the indication of the time-based data source ingestion trigger periodically (e.g., once every hour, day, week, month, or the like). For example, a user may configure a data source to transmit custom event notifications according to a schedule.

In some examples, the data pipeline execution system may continuously monitor the configured data sources for events. Upon identifying a data source ingestion trigger (e.g., an ingestion event), the data pipeline execution system may process the ingestion event (e.g., an event notification) and identify which data is to be ingested. For example, the data pipeline execution system may identify which data is to be ingested based on an event payload of the event notification. For example, the data pipeline execution system may identify a specific file or data resource by extracting relevant metadata from the event notification. Additionally, or alternatively, the data pipeline execution system may, for each identified ingestion event, verify a file location of the data by validating a location path, an event payload, or message attributes, which may help to ensure that the data is ready for processing. Additionally, or alternatively, the data pipeline execution system may extract metadata from the event notification, such as file names, timestamps, or other attributes, which may help to correctly identify the data for processing. As discussed in greater detail below in connection with reference number 140 and FIG. 1B, the data pipeline execution system may, after validating the ingestion event and associated data file(s) or resource(s), trigger an ingestion procedure and initiate appropriate downstream processing.

As shown by reference number 140, the data pipeline execution system may provision, in response to one or more of the event-based data source ingestion trigger or the time-based data source ingestion trigger, a cluster based on one or more cluster specifications or job parameters. The cluster may include a set of compute nodes (e.g., virtual nodes) that form an execution environment for the data pipeline. For example, the cluster specification(s) may include information including a type of the cluster, one or more instance types, an instance count, any specific configurations for the execution of the data pipeline, or the like. The execution of the data pipeline may be referred to as a "job," "data processing job," "task," "processing task," or the like. The job parameter(s) may include information regarding the execution of the data pipeline, such as the location of input data (e.g., the first data source or the second data source), a data pipeline template (e.g., a workflow template), or the like. The data pipeline template is described in greater detail below in connection with reference number 150.

With reference to FIG. 1B, as shown by reference number 150, the data pipeline execution system may execute, using the cluster, a data pipeline (e.g., a workflow) associated with the data pipeline template. The data pipeline template may outline operations for processing the data from the data source or the second data source. The data pipeline may be associated with the data pipeline template in that the data pipeline may include the operations for processing the data outlined in the data pipeline template. For example, the data pipeline template may be a configuration that defines a sequence of the operations followed by the cluster. For example, the data pipeline template may specify (e.g., according to user specifications), for a given data ingestion event, one or more read operations, transformation operations, and write operations that the cluster is to perform on the data. In some examples, the data pipeline template may be one of a plurality of data pipeline templates associated with different data pipelines and/or data ingestion events.

In some aspects, the data pipeline execution system may execute the data pipeline in accordance with a data pipeline file associated with a plurality of data pipelines including the data pipeline. For example, the data pipeline file may include code used for executing the plurality of data pipelines, including the data pipeline. The data pipeline file may be stored in a location accessible by the cluster. For example, the cluster may access the data pipeline file stored in the location before processing (e.g., executing) the data pipeline.

In some aspects, the data pipeline execution system may execute the data pipeline in accordance with a data pipeline execution command. For example, the data pipeline execution command may be a submit command that initiates the execution of the data pipeline. For example, the data pipeline execution command may launch an application packaged into the data pipeline file. The data pipeline execution command may indicate the location of the data pipeline file, a location associated with the data pipeline within the data pipeline file, a location of the first data source or the second data source, and/or a location of the data pipeline template. The location associated with the data pipeline within the data pipeline file may correspond to a path to a main class within the data pipeline file that contains an entry point for execution of the data pipeline. In some examples, the cluster may execute the data pipeline after constructing the data pipeline based on the location of the first data source or the second data source, and the location of the data pipeline template. The data pipeline may be tailored to the specific read operation(s) (e.g., from a data source), transformation operation(s), and write operation(s) (e.g., to a destination) defined in the data pipeline template, as discussed in greater detail below in connection with reference numbers 160, 170, and 180.

As shown by reference number 160, executing the data pipeline may include reading data from the first data source or the second data source. For example, the cluster may ingest the data from one or more predefined data sources (e.g., the first data source or the second data source) in accordance with the read operation(s) defined in the data pipeline template. The read operation(s) may be flexibly and/or dynamically configured, and may accommodate a variety of data input formats (e.g., comma-separated values formats, column-oriented file formats, or the like) or data structures.

As shown by reference number 170, executing the data pipeline may include performing a transformation of the data to generate transformed data. For example, after reading the data, the cluster may transform the data in accordance with the transformation operation(s) defined in the data pipeline template. The cluster may transform the data by modifying the data input formats, data structures, or values of the ingested data. In some examples, the transformations may be user-defined and/or customizable, which may enable complex data operations without manual coding.

In some aspects, the transformation may include one or more of column manipulation, data typecasting, or value transformations. Column manipulation may involve adding, excluding, or renaming columns. Data typecasting may involve casting columns to different data types (e.g., converting integers to strings or converting strings to integers). Value transformations may involve applying operations to column values, such as converting text to uppercase, lowercasing strings, performing arithmetic functions on numerical data, or the like.

As shown by reference number 180, executing the data pipeline may include writing the transformed data to a target data storage location. For example, the cluster may write the transformed data in accordance with the write operation(s) defined in the data pipeline template. The target data storage location may be a destination for the transformed (e.g., processed) data. For example, the cluster may load the processed data in accordance with one or more output preferences, such as a correct storage location, in an appropriate format, and with any optimizations for a selected platform. The data pipeline template may define these output preferences, and the data pipeline execution system may automatically handle the specifics of each target data storage location.

In some aspects, the target data storage location may include one or more of a file-based target data storage location, a relational database table, or a data warehouse. The file-based target data storage location may accommodate large datasets exported as flat files (e.g., comma-separated values formats, column-oriented file formats, or the like). The relational database may may accommodate data written into structured relational storage. The data warehouse may facilitate high-performance analytics. In some examples, the data pipeline template may define multiple candidate target data storage locations, such as the file-based target data storage location, the relational database table, and/or the data warehouse.

In some aspects, the data pipeline execution system may execute the data pipeline in accordance with one or more environment-specific configurations indicating one or more of proxy information or authentication information. The environment-specific configuration(s) may provide information that enables the data pipeline execution system to interact with an environment (e.g., for development, staging, production, or the like), such as one or more external systems (e.g., a database, a data warehouse, or the like). The proxy information may include information for network requests, and may include proxy settings. The authentication information may include token information (e.g., token server details for retrieving secure application secrets or accessing other protected resources) or other authentication details. In some examples, the data pipeline execution system may use an environment name obtained by the cluster to retrieve the one or more environment-specific configurations at runtime (e.g., the environment-specific configurations may be injected at runtime).

As shown by reference number 190, the data pipeline execution system may generate a data pipeline execution completion notification. The data pipeline execution completion notification may indicate that the data pipeline execution system has finished executing the data pipeline. For example, the data pipeline execution completion notification may inform a user regarding a final state of the data pipeline. For example, the data pipeline execution system may automatically transmit the data pipeline execution completion notification to a user device in real-time after the data pipeline execution system has finished executing the data pipeline. The data pipeline execution system may generate the data pipeline execution completion notification regardless of whether the data pipeline execution succeeded or failed.

In some aspects, the data pipeline execution completion notification may indicate a data pipeline execution success. At the conclusion of the data pipeline execution, the data pipeline execution system may evaluate the final state of the data pipeline. For example, the data pipeline execution system may use exception handling to identify the data pipeline execution success. The data pipeline execution system may send a notification (e.g., publish one or more messages) to a success topic that is used to notify users in cases where the data pipeline execution completed successfully. A function of the data pipeline execution system may monitor the success topic, parse the notification, determine that the notification indicates a success, and generate the data pipeline execution completion notification. In some examples, the data pipeline execution system may, based on the notification being in the success topic, send the data pipeline execution completion notification (e.g., a success message) to a designated success channel accessible by one or more users, which may inform the user(s) that the data pipeline has completed successfully. For example, the users may use the success channel to continually monitor and remain informed regarding the status of the data pipeline, and receive timely updates on whether the data pipeline ran successfully or encountered issues, thereby improving operational efficiency and enhancing an overall user experience by providing transparency into the data pipeline execution process.

In some aspects, the data pipeline execution completion notification may indicate a data pipeline execution failure. At the conclusion of the data pipeline execution, the data pipeline execution system may evaluate the final state of the data pipeline. For example, the data pipeline execution system may use exception handling to identify the data pipeline execution failure. The data pipeline execution system may send a notification (e.g., publish one or more messages) to an error topic that is used to notify users in cases where the data pipeline execution failed. In some examples, the notification may include one or more associated error messages, error details, and/or additional context regarding the data pipeline execution failure, such as a cause of the data pipeline execution failure. A function of the data pipeline execution system may monitor the error topic, parse the notification, determine that the notification indicates a failure, and generate the data pipeline execution completion notification. In some examples, the data pipeline execution system may, based on the notification being in the error topic, send the data pipeline execution completion notification (e.g., an error message) to a designated error channel accessible by one or more users. The data pipeline execution completion notification message may include one or more of the error messages, error details, and/or additional context, which may enable the user(s) to diagnose the issue. For example, the users may use the error channel to continually monitor and remain informed regarding the status of the data pipeline, receive timely updates on whether the data pipeline ran successfully or encountered issues, and take corrective action without manual oversight, thereby improving operational efficiency and enhancing an overall user experience by providing transparency into the data pipeline execution process.

The data pipeline being associated with the data pipeline template may enable the data pipeline system to dynamically build and execute multiple data pipelines having varied read, transformation, and write operations using reduced memory and processing resources. For example, the data pipeline system may leverage the data pipeline template to abstract complexity of, streamline, and standardize management of the data pipeline, which may help to reduce memory and processing resource utilization. In some examples, the data pipeline system may accelerate AI-ready data by delivering pre-transformed, structured data from the first data source and/or the second data source to a target data storage location, thereby helping to ensure scalability for advanced AI modeling.

Additionally, or alternatively, the data pipeline template may enable users to define and configure complex data pipelines without writing code, which may help to reduce processing and memory resource utilization caused by errors in manual coding. For example, the data pipeline template may define a sequence of operations (e.g., read, transform, and write), which may enable users to establish data pipelines with varying processing requirements. For example, the data pipeline system may provide a no-code interface whereby users can define, design, configure, generate, and/or manage data processing pipelines without writing code, which may help to improve accessibility of the systems to non-technical users. For example, the data pipeline system may provide an intuitive, code-free solution that empowers engineers to design and generate custom data processing workflows using a user-friendly interface for self-driving. For example, the system may enable quick design and deployment of data pipelines without coding (e.g., via a flexible, no-code interface, which may increase agility and responsiveness). In some examples, data pipeline generation and execution may be streamlined in an automated fashion, thereby reducing instances of manual intervention. For example, automating the generation and execution of data pipelines may help to ensure timely and efficient data processing, thereby improving overall productivity. In some examples, the data pipeline system may offer consistent execution of data processing tasks by adhering to predefined schedules, which may minimize the risk of errors. Moreover, automated data pipelines may help to ensure that data processing adheres to predefined schedules and protocols.

Additionally, or alternatively, the data pipeline template may help to improve data pipeline flexibility, reusability, and/or modification, which may help to reduce processing and memory resource utilization caused by redundant operations associated with designing and/or executing the data pipelines. For example, different users or use cases may leverage the same data pipeline template structure (e.g., with certain parameter adjustments to data source, transformation, target data storage location, or the like), which may enable the data pipeline execution system to simultaneously process multiple data pipeline templates with varying configurations without using custom logic for each unique data pipeline. For example, users may adjust data processing parameters using an interface allowing for quick adaptation. Thus, the data pipeline execution system may deliver high-performing data processing capabilities by writing a data processing template once and then running the data processing template for many data pipelines. Seamlessly specifying data sources within a data pipeline template may reduce complex custom logic, as the data pipeline execution system may handle the underlying complexities of data ingestion.

Additionally, or alternatively, the data pipeline template may enable the data pipeline execution system to scale efficiently by isolating the logic of each data pipeline in a reusable, standardized format. For example, the cluster may handle a high volume of data pipelines concurrently (e.g., by parallelizing the processing of multiple data pipeline templates), which may help to reduce overhead and improve memory and processing resource utilization. In some examples, this scalability may enable the data pipeline execution system to handle large sets of data for large-scale data processing tasks. Moreover, the data pipeline execution system may execute the data pipeline in a distributed manner across the cluster for efficient pipeline execution. Upon a network-related failure, the cluster may automatically recover and attempt to complete successful execution of the data pipeline. Because the data pipeline processing may proceed from the beginning, the data pipeline execution system may refrain from committing results until the data pipeline has been fully executed, which may limit manual intervention by developers to investigate the problem and/or manual attempts to restart the data pipeline, thereby improving memory and processing resource utilization efficiency. Automating the provisioning of clusters (e.g., based on the data event specifications) may help to ensure scalability, efficiency, and flexibility in handling diverse data processing tasks.

Additionally, or alternatively, the data pipeline template may use memory and processing resources efficiently by enabling the data pipeline execution system to integrate with a wide array of platforms and/or data architectures (e.g., data storage and processing systems), which may help to ensure that data pipelines can be quickly adapted to diverse parameters. For example, the data pipeline template may provide a data processing architecture that empowers users to define complex data workflows in a declarative manner. In some examples, the data pipeline execution system may support versatile execution using an integrated mechanism that can handle both batch and real-time data processing within the same architecture, thereby offering flexibility to satisfy different data processing units. Thus, the data pipeline execution system may support various data processing requirements (e.g., through batch and real-time capabilities).

Additionally, or alternatively, the data pipeline file being associated with a plurality of data pipelines may help to reduce memory and processing resources. For example, because the data pipeline file may be used for the plurality of data pipelines, complex changes or new deployments may be avoided in cases where a new data pipeline is used. If changes or updates are made (e.g., to introduce functionality or bug fixes), then a modified data pipeline file may be recompiled and uploaded to storage, and the data pipeline execution system may access and use the data pipeline file for the plurality of data pipelines.

Thus, the data pipeline execution system may provide fast, flexible, accurate, user-friendly, and scalable data insights with reduced custom coding across diverse use cases and data processing parameters. For example, the data pipeline execution system may abstract away underlying complexities of data processing, allowing users to focus on defining the logic of a data pipeline while the data processing system handles the execution details. For example, users may configure data pipeline templates that accommodate a variety of data sources, transformation requirements, and destinations and destination formats, without performing manual coding. The data pipeline execution system may reduce time, cost, and complexity (e.g., memory and processing resource requirements) involved in building and maintaining custom data pipelines, while ensuring seamless integration across different data sources and destinations. The data pipeline execution system may be a powerful, scalable, out-of-the-box framework for executing templated data pipelines that provides ease of use and flexibility for deployment and configuration management and supports the dynamic creation of customizable data ingestion architectures.

Executing the data pipeline in accordance with the one or more environment-specific configurations may allow the same data pipeline file to be used across different environments without changes to the core logic of the data pipeline, thereby further improving memory and processing resource utilization.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
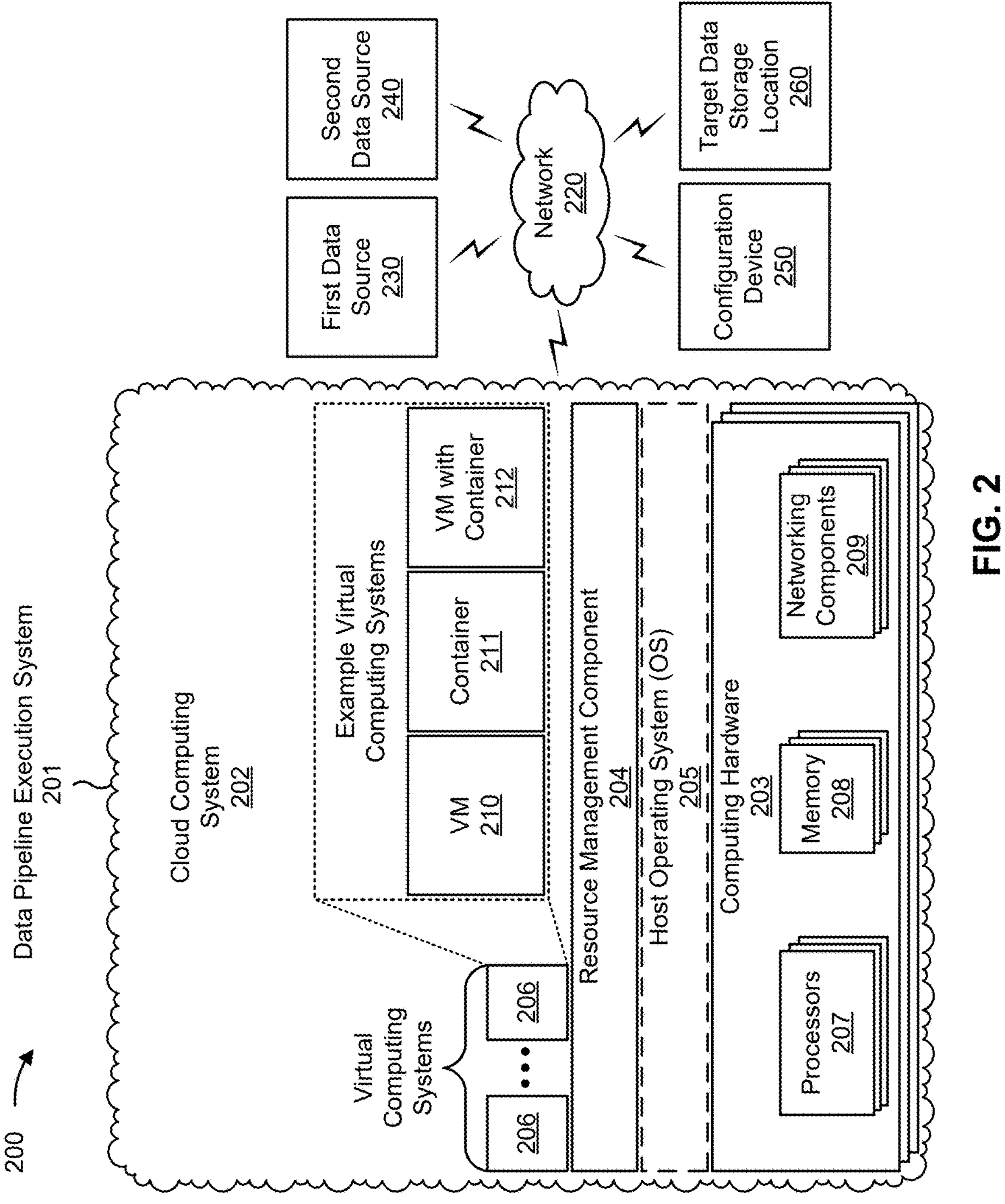
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a data pipeline execution system 201, which may include one or more elements of and/or may execute within a cloud computing system 202. The cloud computing system 202 may include one or more elements 203-212, as described in more detail below. As further shown in FIG. 2, environment 200 may include a network 220, a first data source 230, a second data source 240, a configuration device 250, and/or a target data storage location 260. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the data pipeline execution system 201 may include one or more elements 203-212 of the cloud computing system 202, may execute within the cloud computing system 202, and/or may be hosted within the cloud computing system 202, in some implementations, the data pipeline execution system 201 may not be cloud-based (e.g., may be implemented outside of a cloud computing system) or may be partially cloud-based. For example, the data pipeline execution system 201 may include one or more devices that are not part of the cloud computing system 202, such as device 300 of FIG. 3, which may include a standalone server or another type of computing device. The data pipeline execution system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The first data source 230 may include one or more devices capable of receiving, generating, storing, processing, and/or providing information associated with data pipeline execution, as described elsewhere herein. The first data source 230 may include a communication device and/or a computing device. For example, the first data source 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The first data source 230 may communicate with one or more other devices of environment 200, as described elsewhere herein.

The second data source 240 may include one or more devices capable of receiving, generating, storing, processing, and/or providing information associated with data pipeline execution, as described elsewhere herein. The second data source 240 may include a communication device and/or a computing device. For example, the second data source 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The second data source 240 may communicate with one or more other devices of environment 200, as described elsewhere herein.

The configuration device 250 may include one or more devices capable of receiving, generating, storing, processing, providing, and/or routing information associated with data pipeline execution, as described elsewhere herein. The configuration device 250 may include a communication device and/or a computing device. For example, the configuration device 250 may include a server, such as an application server, a client server, a web server, a database server, a host server, a proxy server, a virtual server (e.g., executing on computing hardware), a server in a cloud computing system, or a similar type of device. In some implementations, the configuration device 250 may include computing hardware used in a cloud computing environment, such as one or more serverless components (e.g., one or more serverless functions). The configuration device 250 may communicate with one or more other devices of environment 200, as described elsewhere herein.

The target data storage location 260 may include one or more devices capable of receiving, generating, storing, processing, and/or providing information associated with data pipeline execution, as described elsewhere herein. The target data storage location 260 may include a communication device and/or a computing device. For example, the target data storage location 260 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The target data storage location 260 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
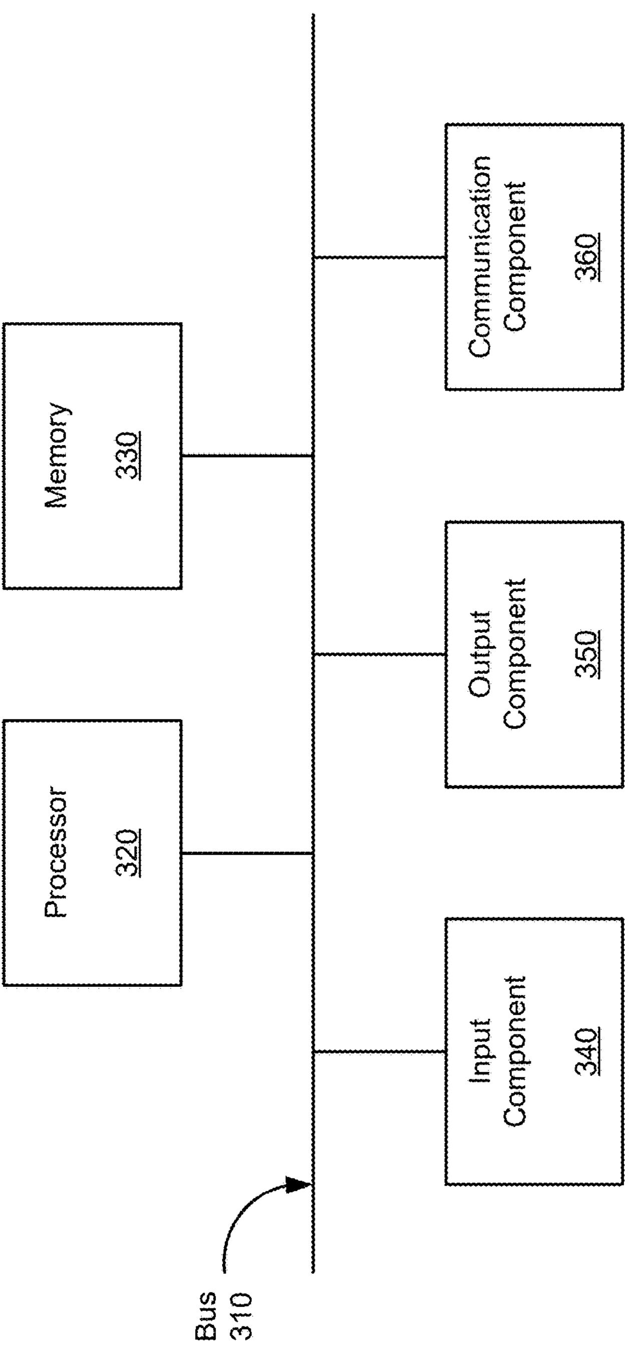
FIG. 3 is a diagram of example components of a device associated with data pipeline execution, in accordance with some embodiments of the present disclosure.

FIG. 3 is a diagram of example components of a device 300 associated with data pipeline execution. The device 300 corresponds to one or more of the data pipeline execution system 201, the first data source 230, the second data source 240, the configuration device 250, and/or the target data storage location 260. In some implementations, the data pipeline execution system 201, the first data source 230, the second data source 240, the configuration device 250, and/or the target data storage location 260 include one or more devices 300 and/or one or more components of the device 300. In the example shown in FIG. 3, the device 300 includes a bus 310, a processor 320, a memory 330, an input component 340, an output component 350, and/or a communication component 360.

The bus 310 includes one or more components that enable wired and/or wireless communication among the components of the device 300. The bus 310 couples together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 includes a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory, such as random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). In some implementations, the memory 330 is a non-transitory computer-readable medium. The memory 330 stores information, one or more instructions, and/or software (e.g., one or more software applications) related to the operation of the device 300. In some implementations, the memory 330 includes one or more memories that are coupled (e.g., communicatively coupled) to one or more processors (e.g., processor 320), such as via the bus 310. Communicative coupling between a processor 320 and a memory 330 enables the processor 320 to read and/or process information stored in the memory 330 and/or to store information in the memory 330.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

In some implementations, the device 300 performs one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with data pipeline execution. In some implementations, one or more process blocks of FIG. 4 may be performed by the data pipeline execution system 201. In some implementations, one or more process blocks of FIG. 4 may be performed by another device or a group of devices separate from or including the data pipeline execution system 201, such as the first data source 230, the second data source 240, the configuration device 250, and/or the target data storage location 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining a data source ingestion configuration associated with a first data source and a second data source (block 410). For example, the data pipeline execution system 201 (e.g., using processor 320 and/or memory 330) may obtain a data source ingestion configuration associated with a first data source and a second data source, as described above in connection with reference number 110 of FIG. 1. As an example, the data source ingestion configuration may indicate one or more data source ingestion triggers that prompt data ingestion.

As further shown in FIG. 4, process 400 may include obtaining, in accordance with the data source ingestion configuration, an indication of an event-based data source ingestion trigger associated with the first data source (block 420). For example, the data pipeline execution system 201 (e.g., using processor 320 and/or memory 330) may obtain, in accordance with the data source ingestion configuration, an indication of an event-based data source ingestion trigger associated with the first data source, as described above in connection with reference number 120 of FIG. 1. As an example, the data pipeline execution system may monitor data storage locations designated by a user and detect when new files are stored in one or more of the data storage locations.

As further shown in FIG. 4, process 400 may include obtaining, in accordance with the data source ingestion configuration, an indication of a time-based data source ingestion trigger associated with the second data source (block 430). For example, the data pipeline execution system 201 (e.g., using processor 320 and/or memory 330) may obtain, in accordance with the data source ingestion configuration, an indication of a time-based data source ingestion trigger associated with the second data source, as described above in connection with reference number 130 of FIG. 1. As an example, the data pipeline execution system may obtain the indication of the time-based data source ingestion trigger periodically (e.g., once every hour, day, week, month, or the like).

As further shown in FIG. 4, process 400 may include provisioning, in response to one or more of the event-based data source ingestion trigger or the time-based data source ingestion trigger, a cluster based on one or more cluster specifications or job parameters (block 440). For example, the data pipeline execution system 201 (e.g., using processor 320 and/or memory 330) may provision, in response to one or more of the event-based data source ingestion trigger or the time-based data source ingestion trigger, a cluster based on one or more cluster specifications or job parameters, as described above in connection with reference number 140 of FIG. 1. As an example, the cluster specification(s) may include information including a type of the cluster, one or more instance types, an instance count, any specific configurations for the execution of the data pipeline, or the like, and the job parameter(s) may include information regarding the execution of the data pipeline.

As further shown in FIG. 4, process 400 may include executing, using the cluster, a data pipeline associated with a data pipeline template in accordance with a data pipeline file associated with a plurality of data pipelines including the data pipeline, and in accordance with a data pipeline execution command that indicates a location of the data pipeline file, a location associated with the data pipeline within the data pipeline file, a location of the first data source or the second data source, and a location of the data pipeline template, including: reading data from the first data source or the second data source, performing a transformation of the data to generate transformed data, and writing the transformed data to a target data storage location (block 450). For example, the data pipeline execution system 201 (e.g., using processor 320 and/or memory 330) may execute, using the cluster, a data pipeline associated with a data pipeline template in accordance with a data pipeline file associated with a plurality of data pipelines including the data pipeline, and in accordance with a data pipeline execution command that indicates a location of the data pipeline file, a location associated with the data pipeline within the data pipeline file, a location of the first data source or the second data source, and a location of the data pipeline template, including: read data from the first data source or the second data source, perform a transformation of the data to generate transformed data, and write the transformed data to a target data storage location, as described above in connection with reference number 150 of FIG. 1. As an example, the data pipeline template may specify, for a given data ingestion event, one or more read operations, transformation operations, and write operations that the cluster is to perform on the data, and the data pipeline file may include code used for executing the plurality of data pipelines, including the data pipeline.

As further shown in FIG. 4, process 400 may include generating a data pipeline execution completion notification (block 460). For example, the data pipeline execution system 201 (e.g., using processor 320 and/or memory 330) may generate a data pipeline execution completion notification, as described above in connection with reference number 190 of FIG. 1. As an example, the data pipeline execution completion notification may indicate a data pipeline execution success or a data pipeline execution failure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data pipeline execution, the system comprising:

one or more memories; and one or more processors, communicatively coupled to the one or more memories, configured to:

obtain a data source ingestion configuration associated with a first data source and a second data source, wherein the first data source and the second data source are distinct data sources;

obtain, in accordance with the data source ingestion configuration, an indication of an event-based data source ingestion trigger associated with the first data source;

obtain, in accordance with the data source ingestion configuration, an indication of a time-based data source ingestion trigger associated with the second data source;

provision, in response to one or more of the event-based data source ingestion trigger or the time-based data source ingestion trigger, a cluster based on one or more cluster specifications or job parameters;

execute, using the cluster, a data pipeline associated with a data pipeline template in accordance with a data pipeline file associated with a plurality of data pipelines including the data pipeline, and in accordance with a data pipeline execution command that indicates a location of the data pipeline file, a location associated with the data pipeline within the data pipeline file, a location of the first data source or the second data source, and a location of the data pipeline template, including:

read data from the first data source or the second data source, perform a transformation of the data to generate transformed data, and write the transformed data to a target data storage location; and generate a data pipeline execution completion notification that indicates a data pipeline execution success or a data pipeline execution failure.

2. The system of claim 1, wherein the data source ingestion configuration indicates a dynamic file location naming protocol.

3. The system of claim 1, wherein one or more of the first data source or the second data source include one or more of a file-based data source, a relational database table, a data warehouse, or an application programming interface (API).

4. The system of claim 1, wherein the one or more processors, to execute the data pipeline, are configured to execute the data pipeline in accordance with one or more environment-specific configurations indicating one or more of proxy information or authentication information.

5. The system of claim 1, wherein the transformation includes one or more of column manipulation, data type-casting, or value transformations.

6. The system of claim 1, wherein the target data storage location includes one or more of a file-based target data storage location, a relational database table, or a data warehouse.

7. A method of data pipeline execution, comprising:

obtaining a data source ingestion configuration associated with a first data source and a second data source, wherein the first data source and the second data source are distinct data sources;

obtaining, in accordance with the data source ingestion configuration, an indication of an event-based data source ingestion trigger associated with the first data source;

obtaining, in accordance with the data source ingestion configuration, an indication of a time-based data source ingestion trigger associated with the second data source;

provisioning, in response to one or more of the event-based data source ingestion trigger or the time-based data source ingestion trigger, a cluster based on one or more cluster specifications or job parameters;

executing, using the cluster, a data pipeline associated with a data pipeline template in accordance with a data pipeline file associated with a plurality of data pipelines including the data pipeline, and in accordance with a data pipeline execution command that indicates a location of the data pipeline file, a location associated with the data pipeline within the data pipeline file, a location of the first data source or the second data source, and a location of the data pipeline template, including:

reading data from the first data source or the second data source, performing a transformation of the data to generate transformed data, and writing the transformed data to a target data storage location; and generating a data pipeline execution completion notification.

8. The method of claim 7, wherein the data source ingestion configuration indicates a dynamic file location naming protocol.

9. The method of claim 7, wherein one or more of the first data source or the second data source include one or more of a file-based data source, a relational database table, a data warehouse, or an application programming interface (API).

10. The method of claim 7, wherein executing the data pipeline includes executing the data pipeline in accordance with one or more environment-specific configurations indicating one or more of proxy information or authentication information.

11. The method of claim 7, wherein the transformation includes one or more of column manipulation, data type-casting, or value transformations.

12. The method of claim 7, wherein the target data storage location includes one or more of a file-based target data storage location, a relational database table, or a data warehouse.

13. The method of claim 7, wherein the data pipeline execution completion notification indicates a data pipeline execution success.

14. The method of claim 7, wherein the data pipeline execution completion notification indicates a data pipeline execution failure.

15. A non-transitory computer-readable medium storing a set of instructions, the set of instructions comprising:

one or more instructions that, when executed by one or more processors of a device, cause the device to:

obtain a data source ingestion configuration associated with a first data source and a second data source, wherein the first data source and the second data source are distinct data sources;

obtain, in accordance with the data source ingestion configuration, an indication of an event-based data source ingestion trigger associated with the first data source;

obtain, in accordance with the data source ingestion configuration, an indication of a time-based data source ingestion trigger associated with the second data source;

provision, in response to one or more of the event-based data source ingestion trigger or the time-based data source ingestion trigger, a cluster based on one or more cluster specifications or job parameters;

execute, using the cluster, a data pipeline associated with a data pipeline template in accordance with a data pipeline file associated with a plurality of data pipelines including the data pipeline, in accordance with a data pipeline execution command that indicates a location of the data pipeline file, a location associated with the data pipeline within the data pipeline file, a location of the first data source or the second data source, and a location of the data pipeline template, and in accordance with one or more environment-specific configurations indicating one or more of proxy information or authentication information, including:

read data from the first data source or the second data source, perform a transformation of the data to generate transformed data, and write the transformed data to a target data storage location; and generate a data pipeline execution completion notification.

16. The non-transitory computer-readable medium of claim 15, wherein the data source ingestion configuration indicates a dynamic file location naming protocol.

17. The non-transitory computer-readable medium of claim 15, wherein one or more of the first data source or the second data source include one or more of a file-based data source, a relational database table, a data warehouse, or an application programming interface (API).

18. The non-transitory computer-readable medium of claim 15, wherein the transformation includes one or more of column manipulation, data typecasting, or value transformations.

19. The non-transitory computer-readable medium of claim 15, wherein the target data storage location includes one or more of a file-based target data storage location, a relational database table, or a data warehouse.

20. The non-transitory computer-readable medium of claim 15, wherein the data pipeline execution completion notification indicates a data pipeline execution success or a data pipeline execution failure.

* * * * *